United States Patent Office 3,822,242
Patented July 2, 1974

3,822,242
MANUFACTURING PROCESS FOR ALTERNATING COPOLYMER OF BUTADIENE AND ACRYLONITRILE BY SUSPENSION POLYMERIZATION
Akira Ohnishi, Koichi Irako, Keisuke Yamamoto, and Yoshio Yokomizo, Tokyo, Fumio Odaka, Kawagoe, Takahiro Kawagoe, Tokorozawa, and Yoshihiro Hayakawa, Takao Aoki, Akira Yamamoto, Motoichi Kikuchi, and Ryozo Sakata, Tokyo, Japan, assignors to Bridgestone Tire Company Limited, Tokyo, Japan
No Drawing. Filed July 27, 1971, Ser. No. 166,625
Claims priority, application Japan, July 28, 1970, 45/65,392; Aug. 13, 1970, 45/70,407
Int. Cl. C08d 1/14, 1/07
U.S. Cl. 260—82.5
13 Claims

ABSTRACT OF THE DISCLOSURE

A invention lies in a process for manufacturing an alternating copolymer of butadiene and acrylonitrile in suspension phase under the following conditions in combination. In the first place, the catalyst system comprises in combination (A) (1) at least one of organoaluminum halides or (2) at least two of aluminum and zinc compounds in combination, and (B) a vanadium compound soluble in a hydrocarbon. Secondly the suspension medium is any one selected from the group consisting of (i) saturated aliphatic hydrocarbons, (ii) saturated alicyclic hydrocarbons, (iii) saturated hydrocarbon halides and (iv) aromatic hydrocarbons each of which has a boiling point lower than 150° C. The accumulative total of the products of the square root of the coherent energy density and of the volume fraction with respect to each of the monomers and the medium must fall in the range of 6 to 9.1. Finally it is necessary to add a stabilizer as comprising at least one selected from the group consisting of aliphatic and alicyclic zinc carboxylates having 8 to 24 carbon atoms and an inactive inorganic powdery material of a dimension smaller than $100\mu$.

The invention relates to a process for the manufacture of an alternating copolymer of butadiene and acrylonitrile, and more particularly to such process by copolymerizing said monomers in suspension phase in the presence of a suspension stabilizer.

It has been reported that the alternating structure copolymer of butadiene and acrylonitrile is superior to copolymers of the same composition but of random structure in tensile strength, dynamic properties, oil resistance and processability. The alternating copolymer referred to herein shall represent such copolymer as having each of butadiene and acryonitrile units arranged alternatively in 1:1 composition, each of which butadiene units is composed substantially of trans-1,4 structure. This can be confirmed by means of elemental analysis, NMR analysis at 100 mHz. and IR spectrum analysis as referred to hereinafter. Owing to such high regularity of the structure, the copolymers as prepared according to the invention give rise to such crystallization as observed with respect to natural rubber when stretching in an unvulcanized state, which would impart to the copolymer as prepared according to the invention superior properties over those of the random structure copolymer.

There have been various problems and difficulties, however, in manufacturing such alternating copolymers on an industrial scale. For instance, catalysts to be generally used for the manufacture of the alternating copolymer are so unstable to water that such an emulsion polymerization method using water as the dispersion medium can hardly be applied thereto. Due to the fact that butadiene-acrylonitrile copolymers have rather poor solubility in any of the usual nonpolar solvents, a homogeneous solution polymerization method also encounters various problems. Catalysts to be used for producing the alternating copolymer are not stable in polar solvents capable of fairly well dissolving the copolymer, such as methyl ethyl ketone, tetrahydrofuran, dimethyl formamide, dimethyl sulfide, dimethyl sulfoxide and nitrobenzene so that the polymerization activity is considerably deteriorated. Although acrylonitrile monomer can be used itself as a solvent for the homogeneous solution polymerization, when the ratio of acrylonitrile to butadiene is made larger it becomes difficult to obtain the copolymer of sufficiently high alternate regularity even in the presence of the alternating copolymerization catalyst; and due to the fact that acrylonitrile is soluble in water and has fairly high polymerizability with other compounds it is difficult to recover acrylonitrile as solvent from the reactant system so that it is not advantageous to use it as the solvent. Thus acrylonitrile also is not suitable as the solvent for the the homogeneous solution polymerization. For the reasons referred to above, only when using any of a very limited kind of halogenated hydrocarbons as the solvent and only in limited yield with respect to the amount of the monomers used, can the homogeneous solution polymerization be practically carried out for manufacturing the alternating copolymer. The viscosity of the reactant system is often increased in an exponential manner in the case of such solution polymerization, as the polymer concentration in the reactant system is increased. In order to obtain the useful butadiene-acrylonitrile copolymers in an industrial scale, thus, the polymer concentration will have to be restricted to a lower level, e.g. 5 g./100 ml. When it is higher than 10 weight percent, the viscosity of the system reaches for instance one million cps. or more so that various disadvantages such as necessity of larger energy for stirring, poor productivity and the like are involved.

On the other hand trying to manufacture the alternating copolymer by polymerizing butadiene and acrylonitrile in an inert medium incapable or hardly capable of dissolving the copolymer also encounters difficulties. When carrying out the precipitation polymerization of such copolymer in a nonsolvent relative to the copolymer, generally the resulting copolymer is directly solidified or fixedly adhered to the inner wall of the reaction vessel and other various portions throughout the apparatus so that stirring is arrested and thermal conductivity is lowered. Further gelation is caused from the adhesion so that it is very difficult to remove the fixed gel in the reaction vessel even by washing with a good solvent such as methyl ethyl ketone. It will be appreciated that the manufacture on an industrial scale is practically impossible according to the precipitation method.

We, the inventors, have tried to carry out the copolymerization to obtain the copolymer on the form of fine particles dispersed in the reactant liquid system utilizing the fact that the copolymers are usually poor in solubility in any of the solvents concerned, as a result of which it has been found to produce various advantages such as that the reactant liquid viscosity is made lower, there is no bar to the stirring and the reaction heat is readily removed owing to the copolymer being copolymerized in fine particles homogenously dispersed, and that the polymer concentration in the reactant system may be readily increased up to a high level in the order of 10 to 20 g./100 ml.

As for the solvent or rather the medium for the dispersion copolymerization according to the invention, such aliphatic hydrocarbons, alicyclic hydrocarbons and halogenated hydrocarbons having a boiling point lower than 150° C. and having no unsaturated bond as well as aromatic hydrocarbons having a boiling point lower than 150° C. and having no unsaturated radical at the side chain thereof are preferably used. Among the aliphatic and alicyclic hydrocarbons there are n-butane, isobutane, n-pentane, n-hexane, n-heptane, n-octane, isooctane, cyclopentane, cyclohexane, methyl cyclohexane, toluene, xylene, benzene, ethylbenzene, n-propylbenzene, petroleum ether and kerosenes. As for the halogenated hydrocarbons, methyl chloride, dichloromethane, carbon tetrachloride, 1,2-dichloroethane, 1,1-dichloroethane, 1,1,2 - trichloroethane, trichloroethylene, monochlorobenzene, 1,2-tetrachloro - 1,2 - difluoroethane may be enumerated. Any mixture of two or more of the above may be used as a dispersion medium. One of the monomers also can be used as the medium in the so-called bulk polymerization method.

The molar ratio of acrylonitrile to butadiene to be copolymerized according to the invention is important for obtaining the high alternate regularity in the structure of the resulting copolymer. It ranges preferably from 0.5:1.0 to 3.0:1.0, and more preferably from 0.5:1.0 to 2.0:1.0.

The reactant system composition is also important for effectively carrying out the copolymerization. Namely, by calculating the product of the square root of the cohesive energy density which shall be represented by $d$ and the volume fraction which shall be represented by $v$ at the polymerization temperature, respectively regarding butadiene and acrylonitrile as well as the dispersion medium other than said monomers, and when the cumulative total of said products which shall be represented by $\Sigma dv$ is considerably lower than 9.1, a swelled oil-drop like copolymer is precipitated immediately after the start of, which is so sticky as to adhere to the inner wall of the reaction vessel, the stirrer and other various portions in the reaction apparatus in a very short time. Despite the strong stirring, the fixedly adhered polymer will not be easily removed. When said $\Sigma dv$ is lower than 8.5 this adhesion will be observed to be remarkable. When said value is higher than 9.1 on the other hand the resulting copolymer is extremely swelled to form a highly viscous but homogeneous solution in the reactant system liquid so that it can not be considered suspension polymerization. Thus the suspension polymerization can be carried out only under very limited conditions, namely in the case where said $\Sigma dv$ ranges form 8.5 to 9.1.

When a dispersion stabilizer to be referred to hereinafter is used, however, said value $\Sigma dv$ can be lowered down to 6.0 as the lower limit. The suspension copolymerization can be carried out in the presence of such stabilizer according to the invention effectively keeping the satisfactory dispersion stability and practically in such a wider range of the reactant system composition as making said value to be from 6.0 to 9.1.

The suspension stabilizer to be used in the invention for that purpose is a zinc salt of a carboxylic acid, among which aliphatic and alicyclic zinc carboxylates having 8 to 24 carbon atoms are preferable. Above all, zinc caprylate, zinc caprate, zinc laurate, zinc myristate, zinc palmitate, zinc stearate, zinc arachidate, zinc behenolate, zinc 2-ethyl hexanoate, zinc oleate, zinc linoleate, zinc abietate, zinc dihydroabietate, zinc tetrahydroabietate, and zinc naphthenate are particularly preferable. Any mixture of two or more of the above of course can be used. Zinc salts of rosin acid, tall oil acid etc. also may be effectively used.

Some inorganic substances in the form of fine particles having a dimension smaller than 100µ and not preventing the activity of the catalyst for the copolymerization have also been found effective for the same purpose. As for the inorganic powder stabilizer, any of the inorganic reinforcing agents and inorganic fillers usually used in the field of the rubber industry may be used, among which are zinc oxide, silicic acid, magnesium carbonate, calcium carbonate, sodium carbonate zinc carbonate, salts of silicic acid such as aluminum silicate, calcium silicate and magnesium silicate, calcium fluoride, dolomite, diatomaceous earth, talc, alumina white, bauxite, mica, aluminum sulfate, calcium sulfate, barium sulfate, lithopone, calcium phosphate, asbestos, graphite, glass fiber, calcium oxide, titanium oxide, magnesium oxide, and clays such as kaolinite, dickite, halloysite, pyrophylite, montmorillonite, bentonite and Japanese acid clay. Of course any mixture of two or more of the above may be used. Combination of one or more of said zinc carboxylates with one or more of said inorganic stabilizers is also effective. This combination may save the amount of the organic stabilizer which is fairly expensive. Among the inorganic stabilizers, silicic acids, calcium carbonate, aluminum silicate, magnesium silicate, diamatoceous earth, talc, clays such as kaolinite, and bentonite are particularly preferable, which would not adversely affect the properties of the resulting polymer.

The amount of the dispersion stabilizer to be used in the invention ranges from 0.5 to 15 weight parts per 100 parts of the monomers, within which the copolymer may be manufactured in the satisfactory dispersion state without lowering the polymerization activity.

According to the invention a catalyst system comprising at least two components (A) and (B) to be referred to hereinafter are used. The component (A) consists of (1) at least one of the organoaluminum halides represented by the formula, $AlR_mX_{3-m}$ in which R means an alkyl of 1 to 10 carbon atoms, X means a halogen and $m$ is 1 or 1.5; or (2) a combination of at least two selected from aluminum and zinc compounds represented by the formulae, $AlR_3$, $AlR_2X$, $AlR_{1.5}X_{1.5}$, $AlRX_2$, $AlX_3$, $ZnR_2$, and $ZnX_2$ in which R and X represent the same meanings as referred to above, provided that the molar ratio of total alkyls to total halogens represened by $d$ must satisfy $0 < d \leq 2$. In combining two or more of said compounds (2) the alkyls and halogens may be the same or varied.

As for the compounds (A) (1), these include methylaluminum sesquichloride, methylaluminum dichloride, ethylaluminum sesquichloride, ethylaluminum dichloride, propylaluminum sesquichloride, propylaluminum dichloride, n-butylaluminum sesqichloride, n-butylaluminum dichloride, isobutylaluminum sesquichloride, isobutylaluminum dichloride, hexylaluminum sesquichloride, hexylaluminum dichloride, octylaluminum sesquichloride and octylaluminum dichloride, as well as the bromides, iodides and fluorides thereof; among which ethylaluminum sesquichloride, ethylaluminum sesquibromide ethylaluminum dichloride, and ethylaluminum dibromide are preferable.

As for the compounds (A) (2), there are enumerated in addition to the compounds referred to above as falling in (A) (1), trimethylaluminum, triethylaluminum, tripropylaluminum, tri-n-butylaluminum, tri-iso-butylaluminum, trihexylaluminum, trioctylaluminum, triphenylaluminum, dimethylaluminum chloride, diethylaluminum chloride, diisopropylaluminum chloride, di-n-butylaluminum chloride, diisobutylaluminum chloride, dihexylaluminum chloride, dioctylaluminum chloride, the bromides, iodides and fluorides thereof, dimethyl zinc, diethyl zinc, di-n-propyl zinc, di-n-butyl zinc, diisobutyl zinc, aluminum chloride, aluminum bromide, aluminum iodide, zinc chloride, zinc bromide and zinc iodide, two or more of which are combined to satisfy said condition to form the component (A). Among the above, triethylaluminum, tri-n-butylaluminum, triisobutylaluminum, diethylaluminum chloride, diethylaluminum bromide, di-n-butylaluminum chloride, di-n-butylaluminum bromide, diisobutylaluminum chloride, diisobutylaluminum bromide, ethylaluminum sesquichloride, ethylaluminum sesquibromide, ethylaluminum dichloride, ethylaluminum dibromide, n-butylaluminum dichloride, n-butylaluminum dibromide, isobutylaluminum dichloride, isobutylaluminum dibromide, diethyl zinc, aluminum chloride, aluminum bromide, zinc chloride, and zinc bromide are preferable to be combined. Preferable combinations are Triethylaluminum—aluminum chloride,
triethylaluminum—zinc chloride, triethylaluminum—aluminum bromide,
triethylaluminum—zinc bromide,
diethylaluminum chloride—ethylaluminum
  sesquichloride,
diethylaluminum chloride—ethylaluminum dichloride,
diethylaluminum chloride—aluminum chloride,
diethylaluminum chloride—zinc chloride,
diethylaluminum chloride—aluminum bromide,
diethylaluminum chloride—zinc bromide,
ethylaluminum sesquichloride—ethylaluminum
  dichloride,
ethylaluminum sesquichloride—aluminum bromide,
ethylaluminum sesquichloride—zinc bromide,
ethylaluminum dichloride—aluminum chloride,
ethylaluminum dichloride—zinc chloride,
ethylaluminum dichloride—aluminum bromide,
ethylaluminum dichloride—zinc bromide,
diethylaluminum bromide—aluminum trichloride,
diethylaluminum bromide—zinc chloride,
diethylaluminum bromide—aluminum bromide,
diethylaluminum bromide—zinc bromide,
ethylaluminum sesquibromide—aluminum chloride,
ethylaluminum sesquibromide—zinc chloride,
ethylaluminum sesquibromide—aluminum bromide,
ethylaluminum sesquibromide—zinc bromide,
ethylaluminum dibromide—aluminum chloride,
ethylaluminum dibromide—zinc chloride,
ethylaluminum dibromide—aluminum bromide,
ethylaluminum dibromide—zinc bromide,
diethyl zinc—aluminum chloride,
diethyl zinc—aluminum bromide,
diethyl zinc—zinc chloride,
diethyl zinc—zinc bromide,
diethyl zinc—ethylaluminum dichloride,
diethyl zinc—ethylaluminum dibromide.

Preferable combinations of three or more are triethylaluminum-aluminum aluminum chloride—zinc chloride, triethylaluminum - aluminum chloride - ethylaluminum dichloride—zinc chloride, ethylaluminum sesquichloride-aluminum chloride—zinc chloride, ethylaluminum dichloride-aluminum chloride—zinc chloride.

Particularly preferable combinations are ethylaluminum dichloride—aluminum chloride, ethylaluminum dichloride—zinc chloride, triethylaluminum-aluminum chloride—zinc chloride.

The manner for combining the (A) (2) compounds to form the catalyst component (A) is not critical, and each of the compounds to be combined may be added directly to the reactant system. Or each may be added after having been complexed with acrylonitrile. Or they may be taken in a nonpolar solvent such as hexane to be reacted with each other then to be added to the reactant system. Or such previously reacted components and the complex or complexes with acrylonitrile may be used in combination.

The molar ratio of total alkyls to total halogens as represented by $d$ must satisfy $0<d\leq 2$ as referred to above. In the case for instance of combining triethylaluminum ($AlEt_3$) and aluminum chloride ($AlCl_3$), thus the molar ration of $AlEt_3/AlCl_3$ must be ½ or less. Said $d$ is more preferably in the range of $0.1\leq d\leq 1.2$.

The second component (B) for the catalyst system is any of such vanadium compounds soluble in a hydrocarbon. The halides, oxyhalides, alcholates and acetyl acetonates of vanadium are preferable, among which are vanadyl trichloride, triethyl-orthovanadate, tri-n-butyl-orthovanadate, tri-tert-butyl-orthovanadate; ethyl-monochloro-orthovanadate, ethyl-dichloro-orthovanadate, tert-butyl - monochloro - orthovanadate, tert - butyl - dichloro-orthovanadate, n - butyl - monochloro - orthovanadate, n-butyldichloro-orthovanadate, vanadium triacetylacetonate, monochlorovanadyl diacetylacetonate, dichlorovanadyl monoacetylacetonate, vanadium tetrachlride, vanadium tetrabromide, vanadium tetraiodide, vanadyl tribromide and vanadyl triiodide.

Each of said components (A) and (B) may be added directly to the reactant system or previously complexed with acrylonitrile before said addition. Above all with respect to aluminum chloride, zinc chloride, aluminum bromide, zinc bromide and the like as (A) (2), it is preferable to use them in the form of a homogeneous solution of the complex with acrylonitrile.

The catalyst system to be used in the suspension copolymerization according to the invention must comprise the components (A) and (B) as referred to above, but in addition thereto a peroxide may be added as the third component (C) for activating the catalyst so as to increase the yield of the resulting copolymer per unit time, which are diacyl peroxides, dialkyl peroxides, peracid esters and dialkyl peroxycarbonates. Among them are benzoyl peroxide, lauroyl peroxide, tert-butyl peroxypyvalate, 2,4-dichlorobenzoyl peroxide, caprylyl peroxide, decanoyl peroxide, propinoyl peroxide, acetyl peroxide, di-tert-butyl peroxide, tert-butyl peroxyisobutylate, p-chlorobenzoyl peroxide, tert-butyl peracetate, tert-butyl perbenzoate, dicumyl peroxide, diisopropyl peroxydicarbonate and tert-butyl peroxyisopropyl carbonate.

The amount of the catalyst component (A) ranges from 0.1 to 5 mol percent per 1 mol of the monomers. The monomer mols referred to is not of the simple total mols of acrylonitrile and butadiene in the reactant system but the total mols of either of said monomers whichever is lesser and a corresponding number of mols of the other monomer.

The catalyst component (B) is added in the molar ratio relative to (A) ranging from 2 to 0.001. Depending on the mol ratio (B)/(A), the molecular weight of the resulting alternating copolymer is varied. The range of 0.5 to 0.005 is more preferable.

The amount of the catalyst component (C) may be varied at will but usually it is added in the range of 0.01 to 1.0 (mol ratio) relative to the component (A).

The invention may be carried out effectively under the conditions as referred to above, but some additives are preferably added for the sake of controlling the molecular weight and preventing gelation.

Additives for preventing gelation are aliphatic mercaptans, among which are n-butyl mercaptan, sec-butyl mercaptan, tert-butyl mercaptan, isobutyl mercaptan, n-octyl mercaptan, tert-octyl mercaptan, n-decyl mercaptan, n-dodecyl mercaptan, tert-dodecyl mercaptan, n-tetradecyl mercaptan, tert-tetradecyl mercaptan, n-hexadecyl mercaptan, and tert-hexadecyl mercaptan.

By adding the mercaptan, gelation can be effectively prevented without lowering the polymerization activity, but when it is added in too large an amount the molecular weight of the resulting copolymer is lowered. In addition to the above, carbon tetrabromide, bromoform and iodoform also are effective as the antigelling agent. It is not always necessary, however, to add the antigelling agent, since gelation can be prevented sufficiently by taking into consideration the ratio of the monomers to the dispersion medium. When adding the antigelling agent, the amount thereof is 1.5 mol relative to the catalyst component (A).

The order of adding the dispersion medium, monomers, stabilizer and antigellating agent is not particularly defined. On addition of the catalyst components also, there is no particular requirement for the addition order when having been complexed with acrylonitrile. When the catalyst system is added as it is, however, the components (A) and (B) should be contacted in the presence at least of acrylonitrile. Said catalyst components are contacted preferably in the mixture of the dispersion medium, butadiene and acrylonitrile. When the catalyst component (A) is contacted with the component (B) in the absence of acrylonitrile, both components are directly reacted to form a heterogeneous system and lower the polymerization activity. When said two components are contacted in the presence only of butadiene without acrylonitrile, homopolymerization of butadiene will occur so that the desired alternating copolymer can not be obtained.

The organic peroxide as the catalyst component (C) may be added in any stage at will. Namely it can be added after addition of the components (A) and (B) to the reactant catalyst system, or concurrently with the addition thereof, or otherwise after having been previously mixed with the two components.

The polymerization temperature is selected at will as long as it falls within the range of −20° to 60° C., but in order to obtain a copolymer which is satisfactory in alternating regularity and molecular weight, the range is preferably from −10° to 40° C. and more preferably from −10° to 20° C. At a temperature higher than 40° C. the molecular weight, alternating regularity, yield and the like of the resulting copolymer are considerably varied so that the result is not satisfactory on the whole.

A further important matter for satisfactorily proceeding with the suspension copolymerization is stirring in the reaction vessel. Above all immediately after initiating the copolymerization, the more vigorously the stirring is carried out, the smaller the particle dimension of the resulting copolymer so that the dispersion stability is increased. At the last stage of the polymerization the strong stirring is not always necessary, but a minimum degree of stirring is still required for preventing stagnation of the liquid reactant system from occurring in the reaction vessel. The vessel is preferably coated with Teflon or lined with glass.

The copolymerization may be terminated for instance by adding water, an alcohol, a ketone or the like so as to decompose the catalyst, but the method for the termination is not critical. After stopping the copolymerization, an antioxidant is added in the amount of 1 to 2 weight percent based on the resulting copolymer. For separating the resulting copolymer various methods may be taken into consideration, such as blowing steam into the reactant system to vaporize the solvent or suspension medium and unreacted monomers; throwing the reactant system into enough methanol to precipitate the copolymer; and filtering off the copolymer from the reaction system before terminating the reaction and adding a small amount of the polymerization terminator thereto to be kneaded.

The resulting copolymer may be then subjected to elemental analysis, NMR analysis and thermal degradation gas chromatography so as to determine the composition ratio and the alternating regularity.

When a test piece of the product copolymer is dissolved in dentrated chloroform to be subjected to the nuclear magnetic resonance absorption analysis at 100 mHz., there would be observed chemical shifts caused by the acrylonitrile and butadiene units. As a result of studies it has been confirmed that the chemical shifts are observed at $7.15\tau$ as caused by the acrylonitrile-acrylonitrile bond, at $7.72\tau$ as caused by the butadiene-acrylonitrile bond and at $7.90\tau$ as caused by the butadiene-butadiene bond, whereby the respective peak values have been calculated by means of "310 Curve Resolver" by Du Pont for determining the respective bond numbers from the corresponding peak areas. Supposing now that a percentage of acrylonitrile-acrylonitrile bond contents relative to the total of various bonds is represented by $F_{AA}$, the corresponding percentage of acrylonitrile-butadiene bond contents by $F_{AB}$ and the percentage of butadiene-butadiene bond contents by $F_{BB}$, said $F_{AB}$ would be a sort of standard scale for prescribing the alternating regularity of the butadiene-acrylonitrile copolymer, which shall be called herein degree of alternating regularity.

The degree of alternating regularity ($F_{AB}$) of the copolymer as obtained according to the invention is 90 to 98%, but that of the copolymer of the same composition but of random structure is only in the order of 75 to 80% at the most. Further, with respect to some of the random structure copolymers, there is often observed no oriented crystalline structure when stretched or drawn. Thus the structural features of the copolymer according to the invention is considerably different from that of the random structure copolymer. According to the infrared absorption spectrum analysis, the microstructure of the copolymer of the invention at the butadiene part comprises almost 95% trans-1,4 bond. It has been confirmed further that the copolymer of the invention is substantially the same as the alternating copolymer disclosed in the 17th Annual Assembly of Kobunshi (or Highpolymers) in Tokyo in May 1968 in glass transition temperature, stress-strain curve, tensile strength, resilience, set, processability and so on. Namely the product of the invention is excellent as a general purpose rubber and oil-resistant rubber for various uses and as materials to be combined for various plastics, adhesives, paints, latex, surface treatment agents and the like.

The invention shall be explained in more detail and more definitely in reference to examples, but it is to be noted that said examples are given not for limiting the invention thereto but merely for the explanation thereof.

Example 1

Into a 1.5 l. capacity glass reaction vessel provided with a 300 ml. funnel, which had been purged with nitrogen gas, was added 35 g. dried zinc stearate and through said funnel 557.7 ml. of dried n-hexane were poured so as to disperse zinc stearate therein with stirring. To said dispersion was added 5.918 mol acrylonitrile. After cooling down to a temperature of −20° C., 5.918 mol purified and liquefied butadiene was poured therein, to which were added 295.9 ml. of a 1 mol hexane solution of ethylaluminum dichloride, 5.918 ml. of 1 mol hexane solution of oxyvanadium trichloride, and then 103.6 m. mol n-dodecylmercaptan in this order. As the resulting copolymer particles are apt to adhere to the vessel inner wall at the surface boundary between the liquid and gas phase, the reaction was carried out in this experiment by filling the vessel with the charged material liquid so as to leave no space for gas phase therein. Immediately upon raising the temperature up to 0° C., precipitation of copolymer particles which range from 1 to 2 mm. in diameter commenced and caused an increase in the concentration as the copolymerization proceeded, but no adhering to the vessel inner wall was observed. After the lapse of 5 hours, the contents of the vessel were removed and subjected to decantation to remove the suspension medium and unreacted monomers. The remaining copolymer was treated with 20 ml. methanol and 1.5 g. 2,6-di-tert-butylparacresol as antioxidant and kneaded so that the particles of the copolymer were broken to form a in slurry, which was poured into about 1,000 ml. methanol to precipitate the copolymer which was dried in vacuo. The resulting copolymer was a rubber-like product in the yield of 34.4%, in which there was observed no gel. The intrinsic viscosity was determined at 30° C. in dimethylformamide as solvent to be 1.26 $F_{AB}=94.5$, $F_{AA}=3.7$ and $F_{BB}=1.8$. The space-time yield was 20.8 (kg./m.$^3$-hr) and the polymer concentration was 12.5 (g./100 ml.). There was observed no adhering of the copolymer to the vessel wall. The catalyst component (A) was used in the amount of 2.5 mol percent relative to the monomers and the component (B) as 1/50 relative to said component (A). At 0° C. n-hexane was used in the amount of 1 to 1 by volume ration relative to the monomers.

The homogeneous solution polymerization wherein a halogenated hydrocarbon is used as the solvent was carried out correspondingly in 1,2-dichloroethane and using ethylaluminum dichloride as catalyst component (A) in the amount of 2.0 mol percent relative to the monomers and oxyvanadium trichloride as component (B) in the amount of 1/50 relative to the component (A) at a temperature of 20° C. for 4.5 hours. The ratio by volume of 1,2-dichloroethane to the monomers was 2 at 20° C. Just before terminating the polymerization the viscosity of the reactant system was about 25,000 cps. so that further proceeding with the polymerization accelerated the increase in viscosity to make the stirring actually impossible, due to which the heat removal efficiency was lowered due to the fact that the heat generated from the stirring was considerably increased. It was clearly anticipated that the reaction temperature control would become difficult and thus the polymerization had to be stopped. The conversion was 17.2% and the intrinsic viscosity number was 1.10. The space-time yield was only 9.2 (kg./m.²-hr) and the polymer concentration was only 4.2 (g./100 ml.).

It can be appreciated that the suspension polymerization according to the invention is far superior to the conventional solution polymerization method from the productivity view point.

Reference Example 1

Into a 1.5 l. capacity glass reaction vessel which had been purged with nitrogen gas, was added 438.3 ml. n-hexane and 3.895 mol acrylonitrile, to which was then added 3.022 mol liquefied butadiene after cooling down to a temperature of −20° C., and then 60.44 ml. of 1 mol hexane solution of ethylaluminum dichloroide and 3.02 ml. of 1 mol hexane solution of oxyvanadium trichloride were added. By raising the temperature up to 0° C. the polymerization was initiated, immediately after which the copolymer began precipitating but the adhering of the copolymer to the vessel wall also was considerably observed. The adhesive deposit was increased by and by as the polymerization proceeded but it was not as considerable as observed in the initial stage. After the lapse of 6 hours, the copolymerization was terminated. The conversion was 20.0% and the gel content was 4.5%. Intrinsic viscosity 1.12, $F_{AB}$=93.5, $F_{AA}$=2.8, and $F_{BB}$=3.7. 69.1% of the resulting copolymer was adhered to the vessel wall and only 30.99 was stably dispersed in the medium. A second experiment showed 77.6% adhereing and 22.4% in stable dispersion. This Reference Example demonstrates that the stability of the resulting copolymer dispersion was very low when zinc stearate was not added. In this experiment $\Sigma dv$ value when the polymerization was terminated was 7.999.

Reference Examples 2 to 10

Into a 1.5 l. glass autoclave which had been purged with nitrogen, 438.8 ml. 1,1,2-trichloroethane and 3.895 mole acrylonitrile were added. After cooling down to a temperature of −20° C., 3.022 mole liquefied butadiene was added, and then ethylaluminum dichloride and oxyvanadium trichloride were added thereto in the amount of 60.44 mmol and 3.022 mmol respectively. The temperature was increased to 0° C. to initiate the polymerization. Immediately after the start of the polymerization, the copolymer was precipitated in the form of fine particles without adhering to a vessel wall but in the considerably satisfactory dispersion state. After the lapse of about 3 hours, however, the viscosity of the reactant liquid was increased to that of a slurry. Stirring effect was localized. After 6 hours, the reactant system was taken out of the vessel to terminate the reaction, when there was observed no cycle nor rotational flow of the reactant liquid in the vessel but considerably swelled copolymer particles were conglomerated together in a lump. The conversion was only 10.70% and the swelling degree amounted to 1,500 based on the dried copolymer. When the polymerization was terminated, the accumulative total of the products of the square root of the cohesive energy density and of the volume fraction with respect to each of the monomers and the dispersion medium, i.e. the value $\Sigma dv$ was 9.23.

The relation of said accumulative total to be represented by $\Sigma dv$ with adhering or suspension condition of the resulting copolymer was examined in relation to various suspension mediums to be used in lieu of 1,1,2-trichloroethane as shown in the following Table.

TABLE 1

| Reference example number | Dispersion medium | Conversion (percent) | Polymer conc. (g./100 ml.) | Space-time yield (g./m³ hr.) | $\Sigma dv$ | Adhering |
|---|---|---|---|---|---|---|
| 2 | 1,1,2-trichloroethane | 10.7 | 3.46 | 5.77 | 9.23 | Viscosity increased as polymerization proceeded. Difficult to stir |
| 3 | Monochlorobenzene | 10.3 | 3.33 | 5.55 | 9.18 | Adhered in lump. |
| 4 | Benzene | 13.7 | 4.44 | 7.40 | 9.00 | Almost no adhering. |
| 5 | Toluene | 10.3 | 3.34 | 5.57 | 8.86 | Do. |
| 6 | Carbon tetrachloride | 16.4 | 5.30 | 8.83 | 8.71 | Do. |
| 7 | Cyclohexane | 19.4 | 6.28 | 10.46 | 8.49 | Adhered a part of polymer precipitated immediately after polymerization initiation. |
| 8 | n-Hexane | 15.2 | 4.91 | 8.19 | 8.01 | |
| 9 | n-Butane | 16.6 | 5.38 | 8.97 | 7.69 | Immediately after polymerization initiation most of polymer fixedly adhered. |
| 10 | Isobutane | 18.8 | 6.09 | 10.15 | 7.43 | |

It can be appreciated from said Table 1 that when a dispersion medium causing said value to be more than 9.2 is used, then the polymerization system is in a satisfactory dispersion state in the initial stage but the viscosity thereof is increased as the polymerization proceeds to cause a stagnation of the reactant liquid or a so-called dead space in the vessel so that the copolymer particles are agglomerated together eventually in one lump; that when a medium is used which causes said value to be smaller than 8.5, then the lesser the value the lower the viscosity so that the reactant is of more fluidity but the precipitated particles of the copolymer are sticky and are more fixedly adhered to the vessel wall.

Examples 2 to 4

The experiments were carried out just same as in Reference Examples 7, 9 and 10 except with the addition of 24 g. zinc stearate, which results are shown in the following Table.

TABLE 2

| Example number | Dispersion medium | Conversion (percent) | Polymer conc. (g./100 ml.) | Space-time yield (kg./m³ hr.) | Adhering |
|---|---|---|---|---|---|
| 2 | n-Butane | 18.6 | 6.02 | 10.0 | No adhering. |
| 3 | Isobutane | 19.9 | 6.42 | 10.7 | Do. |
| 4 | Cyclohexane | 16.4 | 5.30 | 8.8 | Do. |

Examples 5 to 7

Copolymerizations was carried out as in Example 1 in the glass autoclave at a temperature of 0° C. for 6 hours, which results are shown in the followinng Table. When no dispersion stabilizer is used, the copolymer particles are fixedly adhered to the inner wall surface throughout the reaction vessel in a very short time after the reaction is initiated, just as referred to in the foregoing Reference Examples. From the present Examples however it would be appreciated that by virtue of the addition of zinc as stabilizer no adhering of the copolymer occurs but the reactant system may be kept in quite stable dispersion state to proceed with the copolymerization.

TABLE 3

| Example | 5 | 6 | 7 |
|---|---|---|---|
| Monomer: | | | |
| Acrylonitrile (mol) | 5.463 | 5.463 | 6.086 |
| Butadiene (mol) | 5.463 | 5.463 | 6.086 |
| Medium: | | | |
| n-Hexane (ml., 0° C.) | 592 | 767 | 883 |
| Acrylonitrile (ml., 0° C.) | 350.0 | 175.0 | 0.0 |
| $\Sigma\,dv$ | 8.52 | 8.17 | 7.79 |
| Catalyst: | | | |
| Ethylaluminum dichloride (ml.) | 273.2 | 273.2 | 304.4 |
| Oxyvanadium trichloride (ml.) | 5.463 | 5.463 | 6.087 |
| Additives: | | | |
| n-Dodecyl mercaptan (ml.) | 0 | 0 | 106.5 |
| Zinc stearate (g.) | 33 | 32 | 36 |
| Acrylonitrile/butadiene (mol) ratio | 2.0 | 1.5 | 1.0 |
| Medium/monomers (volume ratio) (0° C.) | 1.17 | 1.17 | 0.981 |
| Conversion (percent) | 30.25 | 20.90 | 37.90 |
| Space-time yield (kg./m.³ hr.) | 16.86 | 11.65 | 22.88 |
| Polymer concentration (g./100 ml.) | 10.11 | 6.99 | 13.73 |
| Adhered polymer/total polymer (percent) | $\doteqdot 0$ | $\doteqdot 0$ | $\doteqdot 0$ |
| NMR: | | | |
| $F_{AB}$ | 95.6 | 94.5 | 96.2 |
| $F_{AA}$ | 2.0 | 3.9 | 2.2 |
| $F_{BB}$ | 2.4 | 1.6 | 1.6 |
| $[\eta]$ 30° C., dimethylformamide | 2.53 | 2.58 | 1.47 |
| Gel (percent) | 2.59 | 3.00 | $\doteqdot 0$ |

Examples 8 to 11

Into a 1.5 l. capacity glass autoclave provided with a 300 ml. fuunel, and which had been purged with nitrogen gas, was added zinc stearate, 1,099 ml. cyclohexane, 3.478 mol acrylonitrile and 60.87 mmol n-dodecyl mercaptan. After cooling down to a temperature of −20° C., 3.478 mol liquefied butadiene was added. Then 173.9 mmol ethylaluminum dichloride and 3.478 mmol oxyvanadium trichloride were added to be heated up to a temperature of 10° C. for initiating the copolymerization. After the lapse of 6 hours, the resulting copolymer was separated as in Example 1. The results are shown in the following Table.

TABLE 4

| Example number | Zinc stearate (g.) | Conversion (percent) | NMR $F_{AB}$ | NMR $F_{AA}$ | NMR $F_{BB}$ | Yield (kg./m.³ hr.) | Polymer conc. (g./100 ml.) | Adhered polymer/total polymer (percent) |
|---|---|---|---|---|---|---|---|---|
| (Ref.) 11 | 0 | 42.6 | 93.6 | 6.0 | 0.4 | 14.7 | 8.82 | 26.4 |
| 8 | 6 | 36.4 | 91.3 | 8.1 | 0.6 | 12.6 | 7.56 | 8.8 |
| 9 | 9 | 51.1 | 94.3 | 5.3 | 0.4 | 17.6 | 10.56 | 2.4 |
| 10 | 36 | 52.1 | 93.9 | 4.5 | 1.6 | 18.5 | 11.1 | $\doteqdot 0$ |
| 11 | 60 | 40.4 | 93.9 | 4.5 | 1.6 | 13.9 | 8.34 | $\doteqdot 0$ |

These Examples show the fact that addition of zinc stearate as stabilizer can keep the resulting copolymer particles in a stable dispersion state to prevent adhering without lowering the polymerization activity and without adversely affecting the copolymer structure.

Example 12

A 1.5 l. capacity autoclave whose inner surface was coated with Teflon was charged with 4.01 mol acrylonitrile. After adding 16 g. zinc stearate for dispersion, the temperature was lowered to −20° C., to which suspension was poured 4.01 mol liquefied butadiene, to which were then added 1 mol concentration hexane solutions of ethylaluminum dichloride and of oxyvanadium trichloride in the amounts of 80.2 mmol and 4.01 mmol respectively. The temperature was raised to 0° C. for initiating the copolymerization, immediately after which copolymer fine particles were observed to be precipitated through a peep-window of the autoclave. After the lapse of about 10 minutes, the temperature in the reaction vessel was raised to 7° C. The reaction temperature was kept in the range of 0° to 7° C. by passing a coolant medium through a jacket provided around the reaction vessel. After 1 hour lapse, the reaction was terminated. The reactant system had fine particles of the copolymer dispersed densely therein and there was observed no part adhered to the vessel wall. The conversion was 16.2% and the intrinsic viscosity number was 1.45 in dimethylformamide at 30° C. $F_{AB}=96.8$, $F_{AA}=2.6$, $F_{BB}=0.6$. The polymer concentration was 10.1 g./100 ml. and $\Sigma dv$ value of the reactant liquid when terminating the polymerization was 8.42.

Example 13

A 1.5 l. capacity glass autoclave which had been purged with nitrogen gas was charged with 2.959 mol acrylonitrile, 813.0 ml. Freon 12 (difluoro-dichloromethane) and 24 g. zinc stearate. The temperature was lowered to −20° C. with stirring. Then 2.959 mol liquefied butadiene, 118.36 mmol ethylaluminum dichloride and 5.92 mmol oxyvanadium trichloride were added and heated up to a temperature of 0° C. for initiating the polymerization, which was terminated by adding 50 ml. methanol after 6 hours. No adhesion of the copolymer on the vessel wall was observed. Conversion 35.0%, polymer concentration 10.07 (g./100 ml.), yield 16.8 (kg./m.³-hr.), $F_{AB}=95.6$, $F_{AA}=2.2$, $F_{BB}=2.2$, and $\Sigma dv$ value 6.31 when terminating the polymerization.

Example 14

A glass reaction vessel with a stirrer which had been purged with nitrogen gas, was charged with 1.53 mmol zinc stearate, 42.26 ml. n-hexane and 0.274 mol acrylonitrile, and the temperature was lowered to −20° C. After pouring therein 0.298 mol liquefied butadiene, 7.64 ml. of a n-hexane solution of a reaction mixture of triethylaluminum and aluminum chloride as prepared previously in the mol ratio of 1/2, in a concentration of 1 mol with respect to aluminum was added. Then 7.65 ml. of 1 mol concentration acrylonitrile solution of zinc chloride and 1.53 ml. of 0.5 mol concentration n-hexane solution of oxyvanadium trichloride were added. When raising the temperature up to 0° C. to initiate the polymerization, rice-grain like particles of the copolymer were immediately precipitated. The particles were well dispersed and each was kept in the dimension of a rice grain even after 4 hours without being agglomerated in a lump or film. After the lapse of said 4 hours, a small amount of methanol was added to terminate the polymerization. Yield 42.0%, polymer concentration 13.0 (g. 100 ml.), space-time yield 32.5 (kg./m.³-hr.). The resulting copolymer had an intrinsic viscosity number of 1.80 and had 51.2 mol percent acrylonitrile content. The $\Sigma dv$ value of the reactant liquid when terminating the reaction was 7.93.

Example 15

A 200 ml. capacity glass reaction vessel with a stirrer which had been purged with dried nitrogen gas, was charged with 0.600 mmol zinc stearate, 0.356 mmol zinc dihydroabietate, 0.240 mol acrylonitrile and 52.6 ml. n-butylchloride, and the temperature was lowered to −20° C. Then was 0.239 mol liquefied butadiene. 4.78 ml. n-hexane solution of a reactant mixture previously prepared by mixing triethylaluminum and aluminum chloride in the mol ratio of 1/2, which solution was of 1 mol concentration in respect of aluminum, 4.78 ml. of 1 mol concentration acrylonitrile solution of aluminum tetrabromide or iodoform was added the temperature was raised up to 0° C. to initiate the polymerization reaction. After 3 hours a small amount of methanol was added to terminate the polymerization. The results are shown in contrast with the case where no antigelling agent was added. It can be appreciated from the results that mercaptans, carbon tetrabromide and iodoform are effective as the antigelling agent.

TABLE 5

| Example number | Antigelling agent | | Conversion (percent) | Gel (percent) | AN content (mol percent) |
|---|---|---|---|---|---|
| | Kind | Amount (mmol) | | | |
| 17 | | 0 | 25.0 | 33.5 | 52.6 |
| 18 | Tert-butyl mercaptan | 4.78 | 27.7 | 7.0 | 52.3 |
| 19 | Carbon tetrabromide | 0.478 | 25.0 | 9.9 | 51.6 |
| 20 | Iodoform | 0.478 | 23.9 | 0.2 | 51.5 | chloride, 0.96 ml. of 0.5 mol concentration n-hexane solution of oxyvanadium trichloride, and 3.35 ml. of 1 mol concentration n-hexane solution of tert-butylmercaptan were added thereto in this order. The temperature was raised up to 0° C. for initiating the polymerization, upon which copolymer particles were immediately precipitated. During the polymerization reaction for 5 hours, the particles were kept in quite satisfactory dispersion state without adhering to the vessel wall. After the lapse of said 5 hours, the polymerization was terminated by adding a small amount of methanol. Yield 25.9%, polymer concentration when terminating the polymerization 6.6 (g./100 ml.), space-time yield 13.2 (kg./m.$^3$-hr.). Intrinsic viscosity 146, acrylonitrile content 48.9 mol percent, $F_{AB}$=91.4, $F_{AA}$=5.1, $F_{BB}$=3.4.

Example 16

A 200 ml. capacity glass reaction vessel with a stirrer was charged with 0.956 mmol zinc stearate, 0.312 mol acrylonitrile, and 50.90 ml. n-hexane. After the temperature was lowered to −20° C., 0.239 mol liquefied butadiene was added thereto. Added further thereto was a 9.56 ml. hexane solution of a reactant mixture of triethylaluminum and aluminum chloride in the molar ratio of 1/2 in 1 mol concentration with respect to aluminum. Then 0.96 ml. of 0.5 mol concentration n-hexane solution of oxyvanadium trichloride was added thereto and the polymerization temperature was raised to 0° C. for initiating the polymerization. As the polymerization proceeded the concentration of the copolymer particles increased but no adhesion thereof to the vessel wall was observed. Due to increase of the polymer concentration, the reactant system flow caused by stirring was decreased after the lapse of 3 hours and thus the rotation rate of the stirrer was increased for avoiding located stagnations of the reactant system flow in the reaction vessel. Thus the resulting copolymer was kept in a satisfactory dispersion state in the reactant system until the polymerization was terminated after 5 hours by adding a small amount of methanol. Yield 49.0%, polymer concentration 12.5 (g./100 ml.), space-time yield 25.1 (kg./m.$^3$-hr.). Intrinsic viscosity number of the obtained copolymer 1.21, acrylonitrile content 51.3 mol percent, $F_{AB}$=93.6, $F_{AA}$=3.9, $F_{BB}$=2.5, $\Sigma dv$ value of the reactant liquid when initiating the polymerization 7.76.

Examples 17 to 20

After addition of 0.956 mmol zinc oleate, 0.240 mol acrylonitrile and 52.6 ml. toluene, the reactant system was cooled down to a temperature of −20° C. and charged with 0.239 mol liquefied butadiene. After addition of 4.78 ml. of a toluene solution of a mixture of triethylaluminum and aluminum trichloride in the ratio of 1/2 in 1 mol concentration with respect to the aluminum content and 4.78 ml. of a 1 mol concentration acrylonitrile solution of aluminum chloride, 0.9 ml. of 0.5 mol concentration toluene solution of oxyvanadium trichloride. As an antigelling agent, tertbutylmercaptan, carbon Example 21

In the glass autoclave with a stirrer which had been purged with nitrogen gas were charged 11.04 g. zinc naphthenate, 1171 ml. n-butane and 6.089 mol acrylonitrile. Then the temperature was lowered to −20° C. and 4.656 mol liquefied butadiene was added. Then 31.04 ml. n-hexane solution of aluminum chloride and triethylaluminum mixture in the mol ratio of 2/1 in 3 mol concentration with respect to the aluminum content, 1.55 ml. of 2 mol concentration n-hexane solution of oxyvanadium trichloride and 4.66 ml. of 2 mol concentration toluene solution of benzoylperoxide were added in this order. The temperature was raised to 20° C. but at a temperature of about −5° C. the copolymer was vigorously produced and precipitated in small particles which were suspended in a well dispersed state in the reactant system liquid to be accumulated. After 3 hours the polymerization was terminated by adding methanol containing an antioxidant. The reaction mixture was poured into a large amount of methanol, well washed and dried in vacuo. The yield was 165 g. and the conversion was 33.1%. As a result of the elemental analysis of the obtained copolymer, the acrylonitrile content was 51.5 mol percent and $F_{AB}$ was 92.3. The intrinsic viscosity was 1.94 in dimethylformamide at 30° C.

Example 22

Into a 100 ml. capacity pressure bottle were charged 16.0 g. hexane and 10.35 g. acrylonitrile as well as 1.0 g. bentonite. After cooling down to a temperature of −78° C., 8.07 g. butadiene was added thereto. In this instance $\Sigma dv$ value was 8.050. Thereto were aded a reaction mixture of triethyl aluminum and aluminum trichloride in the molar ratio of 1/2 and in the amount of 5.97 mmol with respect to aluminum, 0.199 mmol vanadyl trichloride and 2.09 mmol t-butyl mercaptan. The reaction bottle was sealed and subjected to shaking at a temperature of 0° C. for 5 hours for the polymerization, which proceeded with dispersing fine particles of the copolymer in the reactant system and there was observed no adhering of the copolymer to the inner wall of the bottle. The resulting product was precipitated in methanol containing about 2% 2.6-di-t-butylparacresol as the antioxidant, sufficiently washed and dried in vacuo. The obtained copolymer was a rubber-like elastomer containing no gel. Yield 29.5%, intrinsic viscosity 1.75, acrylonitrile content 50.4%. As a result of NMR analysis at 100 mHz., $F_{AB}$=94.5, $F_{AA}$=3.9 and $F_{BB}$=1.1.

Example 23

The polymerization was carried out under the same conditions as in Example 22 but in the presence of a stabilizer comprising 1.0 g. bentonite added with 0.075 g. zinc stearate. The resulting copolymer particle was finer than that of the preceding Example but similarly well dispersed in the reaction system. The product was similarly treated to obtain a rubber-like elastomer containing no gel in the yield of 33.2%. Intrinsic viscosity number 1.52, acrylonitrile content 50.9%, $F_{AB}=95.2$, $F_{AA}=3.2$, $F_{BB}=1.6$.

Reference Example 12

The polymerization was carried out under the same conditions as in Example 22 but without using any stabilizer for suspension. The resulting copolymer was adhered to the inner wall of the reaction bottle and there was little copolymer which was dispersedly suspended in hexane. The yield was only 22.9%.

Reference Example 13

A 100 ml. capacity of pressure bottle was charged with 21.2 g. acrylonitrile and 1.0 g. bentonite as the stabilizer, to which 10.8 g. butadiene was added after the temperature was lowered to −78° C. The value $\Sigma dv$ was 9.150 in this instance. Thereto were added a reaction mixture of triethylaluminum and aluminum trichloride in the ratio of 1/2 in the amount of 8.0 mmol relative to the aluminum content and 0.27 mmol vanadyl trichloride, and after sealing of the bottle the polymerization was commenced at a temperature of 0° C., which was proceeded with in the dispersion phase at the initial stage, but the swelling of the copolymer was considerable and finally the reaction system became completely solid. The yield was about 20% after the lapse of 5 hours.

Examples 24 to 31

A 100 ml. capacity pressure bottle was charged with hexane, acrylonitrile and butadiene respectively in the amounts as used in Example 22 and charged with a stabilizer as shown in the following Table. The polymerizations were carried out, after addition of a reaction mixture of triethylaluminum and aluminum trichloride in the ratio of 1/2 and in the amount of 5.97 mmol based on the aluminum content and 0.199 mmol vanadyl trichloride, by sealing and subjecting to shaking of the bottle at a temperature of 0° C. for 5 hours, results of which are also illustrated in the following Table.

TABLE 6

| Example number | Suspension stabilizer Kind | Amount (g.) | Yield (percent) | AN content (percent) | $F_{AB}$ | $F_{AA}$ | $F_{BB}$ |
|---|---|---|---|---|---|---|---|
| 24 | Silica | 1.0 | 42.7 | 51.1 | 92.7 | 6.4 | 1.0 |
| 25 | {Silica / Zinc stearate} | {0.5 / 0.189} | 44.5 | 51.0 | 94.9 | 4.2 | 1.0 |
| 26 | Kaolin | 1.0 | 41.3 | 51.7 | 94.1 | 4.3 | 1.6 |
| 27 | {Kaolin / Zinc stearate} | {1.0 / 0.189} | 40.0 | 51.2 | 92.8 | 6.0 | 1.2 |
| 28 | Bentonite | 1.0 | 40.8 | 51.3 | | | |
| 29 | {Bentonite / Zinc stearate} | {1.0 / 0.189} | 42.3 | 51.1 | | | |
| 30 | Calcium carbonate | 1.0 | 34.5 | 50.8 | | | |
| 31 | {Calcium carbonate / Zinc stearate} | {0.5 / 0.189} | 33.0 | 50.3 | | | |

The polymerization reactions carried out were in the suspension state, and there was observed no adhesion of the copolymer to the vessel walls in either case.

Examples 32 to 33

The polymerization was carried out under conditions as in Example 24 and consequently using 1.0 g. silica as stabilizer but further in the presence of a peroxide as referred to in the following Table.

TABLE 7

| Example number | Peroxide Kind | Amount (mmol) | Yield (percent) | AN content (percent) |
|---|---|---|---|---|
| 32 | Benzoyl peroxide | 2.0 | 45.3 | 50.9 |
| 33 | Diisopropyl peroxydicarbonate | 0.1 | 47.7 | 51.3 |

The polymerizations were very satisfactorily carried out in the suspension state, and there was observed no adhesion of the copolymer to the vessel walls in either case.

What we claim is:

1. Process for the manufacture of an alternate copolymer of butadiene and acrylonitrile in the form of a suspension of fine particles and having a degree of alternation of 90 to 98% and a 95% trans-1,4 bond microstructure in the butadiene units, comprising contacting a mixture of the monomers in the molar ratio of acrylonitrile to butadiene ranging from 0.5 to 3.0 with a catalyst system consisting essentially of in combination (A) at least one component selected from the group consisting of (1) organoaluminum halides having the formula $AlR_mX_{3-m}$ wherein R represents an alkyl radical having 1 to 10 carbon atoms, X represents a halogen atom and $m$ is 1 or 1.5 and (2) at least two in combination of the compounds of formula $AlR_3$, $AlR_2X$, $AlR_{1.5}X_{1.5}$, $AlRX_2$, $AlX_3$, $ZnR_2$ and $ZnX_2$ wherein R and X have the same meanings as above so as to satisfy $0<d\leq2$ in which $d$ is the molar ratio of total hydrocarbon radicals to total halogens in which combination the hydrocarbon radicals and halogens may be the same or different and (B) a vanadium compound soluble in a hydrocarbon, under vigorous stirring, in a medium selected from the group consisting of (i) saturated aliphatic hydrocarbons, (ii) saturated alicyclic hydrocarbons, (iii) saturated hydrocarbon halides and (iv) aromatic hydrocarbons having no unsaturated bond at the side chain thereof, each of which has a boiling point lower than 150° C. at atmospheric pressure so that an accumulative total of the products of the square root of the coherent energy density and of the volume fraction with respect to each of the monomers and the medium is in the range of 6 to 9.1, at a temperature of −20° to 60° C., in the presence of a suspension stabilizer in the amount 0.5 to 15 parts by weight per 100 parts by weight of the monomers consisting of at least one stabilizer selected from the group consisting of aliphatic and alicyclic zinc carboxylates having 8 to 24 carbon atoms and inactive, inorganic, powdery materials having a particle size smaller than 100μ to form the copolymer in the form of a suspension of fine particles.

2. Process as claimed in claim 1, in which said vanadium compound as second catalyst component (B) is used in the amount ranging from 2 to 0.001 molar ratio relative to said first component (A).

3. Process as claimed in claim 1 in which either of said catalyst components (A) and (B) is previously complexed with acrylonitrile before use.

4. Process as claimed in claim 1, in which said catalyst components are mixed in the presence of acrylonitrile.

5. Process as claimed in claim 1 in which the catalyst component (A) is selected from the group consisting of ethylaluminum dichloride, a combination of triethylaluminum-aluminum trichloride and a combination of triethylaluminum-aluminum trichloride-zinc chloride.

6. Process as claimed in claim 2, in which the catalyst component (B) is selected from the group consisting of vanadium halides, oxyhalides, alcoholates and acetyl acetonates.

7. Process as claimed in claim 1, in which an organic peroxide is added as a third catalyst component in the amount ranging from 0.01 to 1.0 molar ratio to said first component (A).

8. Process as claimed in claim 7, in which the third catalyst component is selected from the group consisting of benzoyl peroxide and diisopropyl peroxydicarbonate.

9. Process as claimed in claim 1, in which the suspension medium is selected from the group consisting of n-hexane, n-butane, isobutane, cyclohexane, n-butyl chloride, difluorodichloromethane and toluene.

10. Process as claimed in claim 1, in which the stabilizer is selected from the group consisting of zinc stearate, zinc oleate, zinc naphthenate, zinc dihydroabietate, bentonite, silica, kaolin and calcium carbonate.

11. Process as claimed in claim 1, in which an antigelling agent selected from the group consisting of aliphatic mercaptans, carbon tetrabromide and iodoform is added in the amount of 1.5 molar ratio at most relative to the first catalyst component (A).

12. Process as claimed in claim 11, in which the aliphatic mercaptan is n-dodecyl mercaptan or t-butyl mercaptan.

13. A process according to claim 1 in which the accumulative total of the products of the square root of the coherent energy density and of the volume fraction with respect to each of the monomers and the medium is in the range of 8.5 to 9.2.

References Cited

UNITED STATES PATENTS

| 3,700,637 | 10/1972 | Finch | 260—82.5 X |
| 3,658,775 | 4/1972 | Kawasaki et al. | 260—82.5 |

FOREIGN PATENTS

| 1,226,927 | 3/1971 | Great Britain | 260—82.5 |
| 2,020,772 | 11/1970 | Germany | 260—82.5 |

OTHER REFERENCES

Polymer Processes; vol. X, High Polymers, by Schildknecht 2–1956, Interscience Publishers Inc., pages 78 and 80.

JOSEPH L. SHOFER, Primary Examiner

W. F. HAMROCK, Assistant Examiner

U.S. Cl. X.R.

260—82.3, 95